(12) United States Patent
Yoon (10) Patent No.: US 6,684,069 B1
(45) Date of Patent: Jan. 27, 2004

(54) AUDIBLE NOTIFICATION OF CALLED MESSAGE (ANCM) SERVICE IMPLEMENTATION METHOD ON WIRELESS INTELLIGENT NETWORK (WIN)

(75) Inventor: Seung-Eon Yoon, Kyoungki Do (KR)

(73) Assignee: LG Electronics Inc., Seoul (KR)

( * ) Notice: Subject to any disclaimer, the term of this patent is extended or adjusted under 35 U.S.C. 154(b) by 429 days.

(21) Appl. No.: 09/721,980

(22) Filed: Nov. 27, 2000

(30) Foreign Application Priority Data

Nov. 30, 1999 (KR) ........................................ 1999/53993

(51) Int. Cl.[7] ............................................. H04M 3/42
(52) U.S. Cl. ............................. 455/414.1; 379/88.12; 379/88.22; 455/412.1; 455/466
(58) Field of Search ........................... 455/414.1, 412.1, 455/413, 566, 567, 416, 462, 466, 417; 379/88.12, 88.11, 67.1, 88.13, 88.1–88.15, 88.22, 88.23

(56) References Cited

U.S. PATENT DOCUMENTS

| | | | |
|---|---|---|---|
| 5,802,466 A | * 9/1998 | Gallant et al. | ............... 455/413 |
| 5,898,760 A | * 4/1999 | Smets et al. | ............. 379/88.21 |
| 6,032,039 A | * 2/2000 | Kaplan | ....................... 455/413 |
| 6,181,736 B1 | * 1/2001 | McLaughlin et al. | ....... 375/222 |
| 6,298,232 B1 | * 10/2001 | Marin et al. | ................. 455/413 |
| 6,418,306 B1 | * 7/2002 | McConnell | .................. 455/413 |
| 6,421,545 B1 | * 7/2002 | Christal | ....................... 455/566 |
| 6,496,570 B1 | * 12/2002 | Nimphius | ................ 379/88.25 |

FOREIGN PATENT DOCUMENTS

CN 1226712 A 9/1999

* cited by examiner

Primary Examiner—Charles Appiah
Assistant Examiner—Nghi H. Ly
(74) Attorney, Agent, or Firm—Fleshner & Kim, LLP

(57) ABSTRACT

The present invention discloses a method of providing Audible Notification of Called Messages (ANCM) to receiving terminals. The receiving terminals can be on a Wireless Intelligent Network (WIN). The method includes starting a Short Message Delivery Point-to-Point service to a corresponding MSC by the SMC when a standby short message is received for the mobile subscriber. A communication channel is then established between the SN and the MSC when an ancm-available-trigger is activated, after the MSC checks the trigger of the receiving mobile subscriber. A recorded announcement is next broadcasted to announce the reception of the standby message. This is done by connecting a call to the corresponding receiving terminal. It is next determined whether to transmit the received standby message, based on a digit inputted by the corresponding receiving terminal. Finally, the received standby message is transmitted or the call is released according to the inputted digit.

23 Claims, 10 Drawing Sheets

AUDIBLE NOTIFICATION OF CALLED MESSAGE (ANCM) SERVICE IMPLEMENTATION METHOD ON WIRELESS INTELLIGENT NETWORK (WIN)

BACKGROUND OF THE INVENTION

1. Field of the Invention

The present invention relates to a Wireless Intelligent Network (WIN), and in particular to an Audible Notification of Called Message (ANCM) service on the WIN.

2. Background of the Related Art

Throughout the development of mobile communication networks, aside from voice communication, there have been many attempts to add various services to personal portable communication systems. The necessity of a unified international standard that permits global roaming anywhere has been emphasized. According to such need, an Intelligent Network (IN) concept for dividing call processing and service performing has been introduced.

A Wireless Intelligent Network (WIN) has been standardized on the basis of the conventional North America standard ANSI-41 (American National Standards Institute 41) by adding an Intelligent Network Capability Set 2 (IN CS-2) standard of the ITU-T (International Telecommunication Union-Telecommunication).

It is possible to perform intellectualization and unification of wire/wireless communication networks, and support multimedia service and Internet service by combining an Asynchronous Transfer Mode (ATM) network, and make a communication network structure of a service control format through the WIN.

The WIN can be implemented as an independent service network that is capable of developing a flexible service rapidly and easily, that can provide a standardized interface between various Network Entities (NE), and that has an open architecture of a distribution control format having high dispensability.

The WIN is being standardized in the TR-45.2 (a lower organization of the Telecommunication Industry Association) in order to provide an Advanced Network Service (ANS), a Seamless Terminal Service (STS), and a Personal Mobility Service (PMS) on the mobile communication network.

As with the Global System for Mobile communication (GSM) or an Advanced Intelligent Network (AIN), the standardization of the WIN is proceeding in phases. Until now, the intelligent network service defined in WIN phase I is a Voice Controlled Service (VCS), an Incoming Controlled Service (ICS) and a Calling Name Presentation/Restriction (CNAP/CNAR). Services related to billing, such as a Pre-Paid Charging, Premium Rate Charging, Location Based Charging, Freephone Service, as well as other services including Wireless Number Portability, Message Accounting, Routing to a Specific Trunk Group, and Automatic Code Gapping Service are included in WIN Phase II.

Subsidized standardization of WIN Phase I has proceeded, for example as Interim Standard IS-771 and IS-764. Standardization of WIN-Phase II was planned for late 1999.

An ANCM service is a service that is capable of using a voice to inform a mobile communication subscriber of a voice message or a character message sent to the subscriber.

In a related art communication network, upon receiving a voice or character message, a subscriber is informed of receipt of a standby message by an inform function to the subscriber's mobile communication terminal through a Short Message Center (SMC). The inform function informs the reception standby message by setting a certain value on a Pip Tone/Alerting Tone or a Message Waiting Indicator (MWI), according to a subscriber profile, and transmitting it to the terminal.

The method for informing a subscriber of the receipt of a standby message is implemented through a Message Waiting Notification (MWN) method and a Short Message Delivery Point-to-Point (SMDPP) method using a short message.

Figure 1:
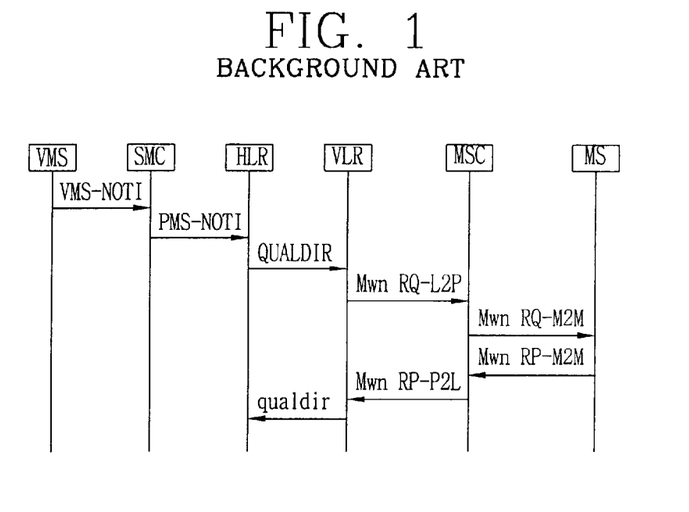
FIG. 1 is a flow chart illustrating a voice or character message notification process according to a Message Waiting Notification (MWN) method on a related art mobile communication network.

Referring to FIG. 1, the operation of the inform function of the reception of a standby message through the MWN method will be described.

When a new reception standby message is provided, a Voice Message System (VMS) notifies a SMC of the number change of the voice message (VMS-NOT1). The SMC notifies a Home Location Register (HLR) of the number change of the reception standby voice message or short message (PMS-NOT1).

The HLR then transmits the change information to a Visiting Location Register (VLR) through a Qualification directive (QUALDIR), and awaits a corresponding result message.

The Visiting Location Register (VLR) determines a certain tone according to the user profile, or sets a MWI. It then transmits the tone or MWI through an Inter-Process Communication (IPC) of a Mobile Switching Center (MSC) (MwnRQ-L2P). The MSC provides a prescribed tone to a Mobile Station (MS) according to the set value set in the VLR, or transmits the display information of the Mobile Subscriber (MS) to the MS according to the MWI (MwnRQ-M2M). The reception standby message is thus provided to the receiver.

Figure 2:
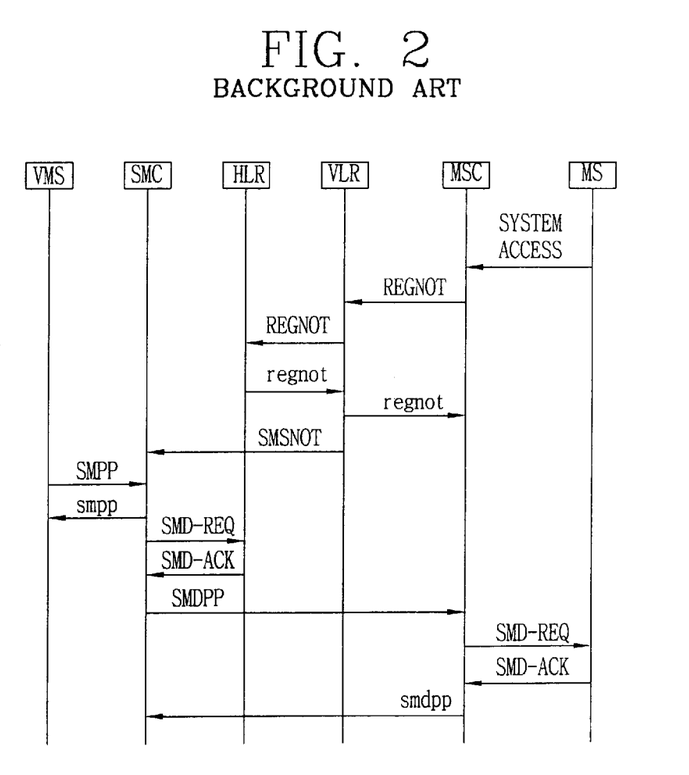
FIG. 2 is a flow chart illustrating the voice or character message notification process according to a Short Message Delivery Point-to-Point (SMDPP) using a simple sentence message on the related art mobile communication network.

Referring to FIG. 2, the operation of the inform function for receipt of a standby message through the SMDPP method will be described.

When a reception standby message is provided and the mobile subscriber is roaming to the service available area (System Access), an Origination MSC requires a position registering to the VLR through a Registration Notification (REGNOT).

The VLR transmits the registration notification (REGNOT) to the HLR, and awaits the corresponding result message. The VLR transmits the result message (regnot) received from the HLR to the MSC. In addition, the VLR notifies the service available state of the mobile subscriber by transmitting a Short Message Service Notification (SMSNOT) to the SMC.

When the VMS receives the new voice message, the VMS notifies the SMC of the arrival of the new voice message through a Short Message Point-to-Point (SMPP), and awaits the corresponding result message.

The SMC sends the result message (smpp) back to the VMS. When the SMC does not know the location information of the reception standby subscriber, it requests (SMS-REQ) the location information of the corresponding subscriber from the HLR. The HLR answers by providing the location information of the corresponding subscriber to the SMC.

Meanwhile, the SMC determines the number of the reception standby message and related information, and transmits it to a serving MSC through the SMDPP. The serving MSC transmits (SMD-REQ) the short message to the MS, and awaits the corresponding answer message.

The serving MSC receiving the answer message (SMD-ACK) from the corresponding MS transmits the corresponding result message (smdpp) to the SMC.

The related art mobile communication network processing the voice or character message by the above-described methods has several problems. For example, all messages are received regardless of the intention of the subscriber. Additionally, received messages are displayed on the subscriber's mobile terminal or a certain tone is alarmed. When a standby message is received and the user does not check it, a certain tone is sounded whenever the subscriber initiates a call or receives a call. This is potentially unwanted by the subscriber. In addition, the state of the receiving message may be overlooked when the subscriber is not paying much attention to it.

The above references are incorporated by reference herein where appropriate for appropriate teachings of additional or alternative details, features and/or technical background.

SUMMARY OF THE INVENTION

It is an object of the present invention to provide ANCM service that overcomes disadvantages caused by problems in the related art.

Another object of the present invention is to define an ANCM service on a WIN and provide an implementation method thereof that allows a mobile communication subscriber to select reception of a voice or a character message in accordance with the his/her intention by converting the notification function into a voice, and notifying the user of the reception of a voice or character message with a voice.

It is another object of the present invention to provide a method for implementing an ANCM service on a WIN that allows a mobile communication subscriber to select reception of a voice or a character message in accordance with the his/her intention by converting the notification function into a voice, and notifying the user of the reception of a voice or character message with a voice.

Another object of the present invention is to restrict or otherwise filter the reception of voice or character messages in accordance with a subscriber's preferences.

Another object of the present invention is to provide a service corresponding to a subscriber's preferences with respect to message notification by designating a certain language or voice in which to provide verbal notification in accordance with the taste of the subscriber.

In order to achieve at least the above described objects in whole or in parts, the present invention defines an ANCM service on a WIN that is capable of notifying a subscriber by voice of the reception of a message, by establishing a communication channel between the subscriber in the receiving of the voice or character message.

In order to further achieve the above objects, in whole or in parts, when for example, a standby voice or short message is received, there is provided a method of implementation ANCM service on a WIN, having a first process for starting a SMS service to the corresponding MSC when there is a reception standby voice or short message, a second process for establishing a communication channel between the MSC and ANCM service control system when the ANCM service of the receiving mobile subscribers is activated, and a third process for performing a call connecting to the corresponding receiving terminal by the MSC and transmitting a recorded announcement broadcasting about the reception standby message to the receiving terminal by the ANCM service control system.

In order to further achieve the above objects, in whole or in parts, there is provided a standby short message to the mobile subscriber, a method of implementing ANCM service on a WIN including a process for starting a Short Message Delivery Point-to-Point to the corresponding MSC by the SMC when there is a reception standby short message to the mobile subscriber, a process for establishing a communication channel between the SN when the ancm-available-trigger is activated after checking the trigger of the receiving mobile subscriber by the MSC, a process for performing a recorded announcement broadcasting about the reception standby message by performing the call connecting to the corresponding receiving terminal, a process for determining whether it transmits the reception standby message according to the digit inputted by the corresponding receiving terminal, and a process for transmitting the reception standby message or releasing the call connection according to the result of the determining process.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

An ANCM service on a WIN according to a preferred embodiment of the present invention can be defined as one of the intelligent network services provided by using a Service Control Point (SCP), an Intelligent Peripheral (IP), or a Service Node (SN).

The ANCM service is registered and is de-authorized on an ANCM service control system by an operator's command. When the ANCM service is provisioned, the service is authorized; when the provisioning of the ANCM service is canceled, the service is de-authorized. Additionally, when a feature code for activating the ANCM service, preferably in the form of digits, is inputted from the corresponding mobile subscriber, the ANCM service control system activates the ANCM service of the corresponding mobile subscriber. An ANCM membership authorized member may activate his or her membership in the member's default ANCM group(s) by specifying the ANCM membership activation feature code. This can be done, for example, by inputting *FC+SEND. If the activation is accepted, the ANCM service control system preferably indicates success with feature confirmation.

When digits for inactivating the ANCM service, for example feature code FC0, are inputted by a mobile subscriber, the ANCM service control system inactivates the ANCM service of that mobile subscriber. An ANCM membership authorized member may de-activate his or her membership in the member's default ANCM group(s) by specifying the ANCM membership deactivation feature code, for example, *FC0+SEND.

In addition, when registering the ANCM service, the ANCM service control system preferably performs a message voice notification function with various languages, according to the selection of the mobile subscriber. Additionally, the ANCM service control system provides a voice announcement function, preferably including a caller's name, by using an ID of the received message. Furthermore, the mobile subscriber can register other people as an ANCM membership activation or deactivation.

The method for the ANCM service implementation on the WIN according to a preferred embodiment of the present invention will now be described.

As an initial matter, in order to provide the backward compatibility between the conventional Pre-WIN system, the standardization of the WIN is divided into a SCP-based SIM (Service Control Point-based Service Interaction Manager) and a HLR-based SIM, and defines each Information Flow. In the standardization of the WIN, the WIN has two different approach methods according to the ANCM service implementation for each SIM and a Network Architecture related to it. In other words, when the ANCM service control system is implemented with the SN, the ANCM service is implemented by using the SN, and when the ANCM service control system is implemented with the SCP and IP, the ANCM service is implemented by using the SCP and IP.

Hereafter, the methods of implementing the ANCM service on the WIN according to each approach method will be described with reference to accompanying drawings. In each case, reference will also be made to the steps shown in FIG. 3.

Figure 4:
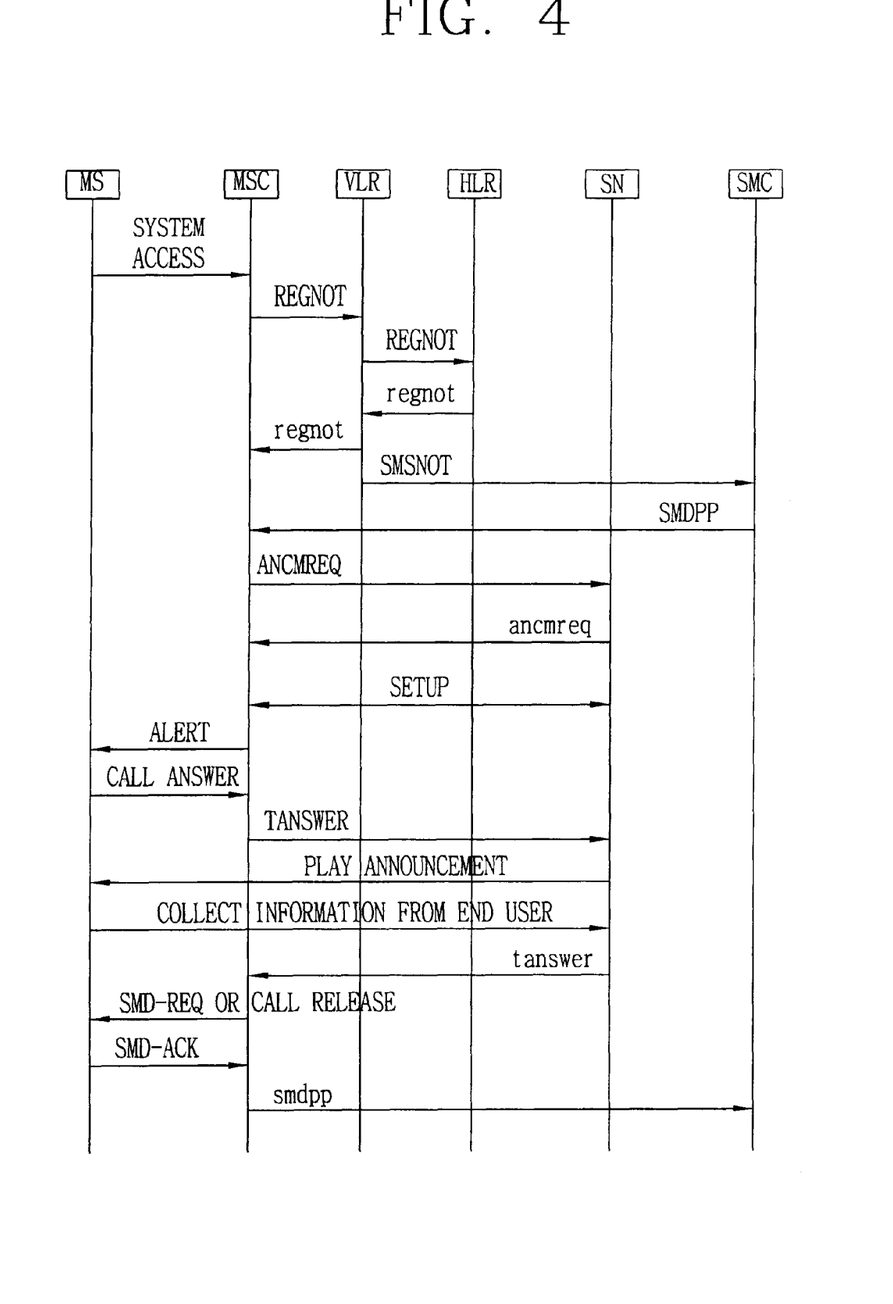
FIG. 4 is a diagram illustrating the ANCM service implementation method for a short message by a Service Control Point-based Service Interaction Manager (SCP-based SIM) on the WIN provided by using a Service Node (SN) according to a first preferred embodiment of the present invention.

First, FIG. 4 is a diagram illustrating the method of implementing ANCM service for a short message by a SCP-based SIM on the WIN using a SN (Service Node), according to a first preferred embodiment of the present invention.

The SN (Intergrated SCP and IP) searches Calling Name Information (CNI) inside a SN database using an ID of the mobile subscriber. The CNI is converted into a voice using the CNI as a key, when there is a received message to the mobile subscriber, it has a function which is capable of notifying it with a voice.

First, when the mobile subscriber registered on the ANCM service requests a registration notification (REGNOT) to the VLR by roaming a service available area, the pertinent VLR transmits the request to the HLR, and transmits a result message (regnot) received from the HLR to the pertinent MSC.

And, when the standby message is received by the corresponding subscriber, the VLR transmits a SMSNOT (Short Message Service Notification) according to a Message Waiting Notification of the mobile subscriber to the SMC, accordingly the SMS service available state is notified to the corresponding mobile subscriber.

Meanwhile, in performing the ANCM service, when the receiving mobile subscriber is in the SMS service available state, the voice notification function of the short message is performed without the location updating process.

Figure 3:
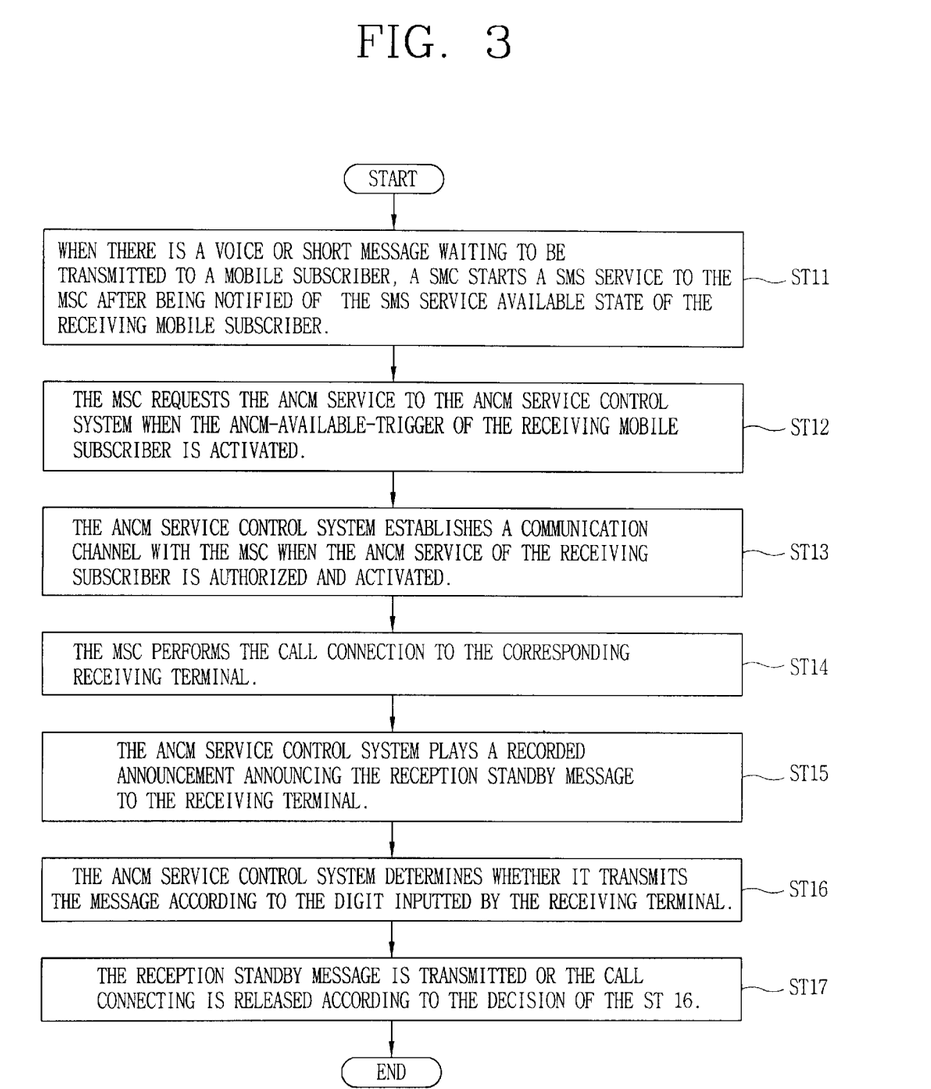
FIG. 3 is a flow chart illustrating an ANCM service implementation method on a WIN according to a preferred embodiment of the present invention.

The SMC receiving the SMSNOT transmits a SMDPP (Short Message Delivery Point-to-Point) to the Serving MSC, as shown in ST11.

When the Serving MSC examines a trigger of the receiving mobile subscriber and the ancm-available-trigger is activated, and the Serving MSC sends an ANCM Request (ANCMREQ) to the SN, as shown in Step ST12.

The SN returns the result message (ancmreq) including appropriate parameters to the Serving MSC after examining the pertinent service registering and activation. This is done by searching the profile of the receiving subscriber. A communication channel is thus set between the SN and Serving MSC, as recited in Step ST13.

The Serving MSC then pages the receiving terminal (ALERT) and receives a call answer from the pertinent terminal, in this case the MS. The Serving MSC then notifies a TANSWER to the SN, as recited in Step ST14.

The SN performs a recorded announcement broadcasting of the pertinent receiving message, using a traffic channel between the SN and the receiving terminal, as recited in Step ST15. When digits are inputted from the pertinent terminal, the SN receives and analyzes the digits and returns an appropriate result message (tanwer) to the serving MSC.

The serving MSC next determines whether the simple setence character message has been transmitted after analyzing the received result message, as recited in Step ST16. If the serving MSC has not transmitted the short message, it either performs a call release or transmits the short message. The transmission of the short message is performed by transmitting the reception standby message in either a voice format or as a character format, according to a selection of the receiving mobile subscriber. After the transmission of the short message, when an answer is received, the serving MSC transmits the result message (smdpp) corresponding to the answer to the SMC, as recited in Step ST17.

Figure 5:
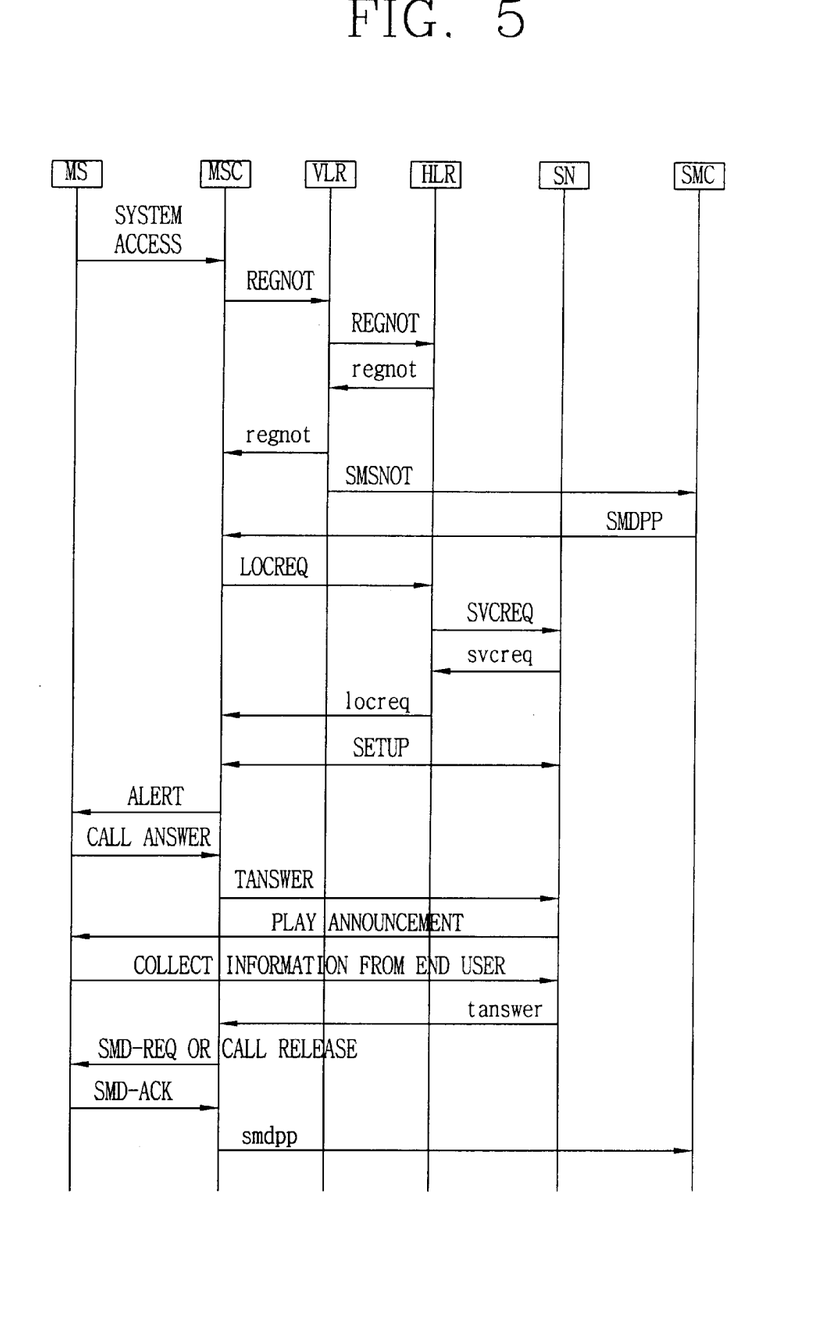
FIG. 5 is a diagram illustrating the ANCM service implementation process for a short message by a HLR-based SIM on the WIN provided by using the SN according to a second preferred embodiment of the present invention.

FIG. 5 is a diagram illustrating a method of implementing the ANCM service for a short message using a HLR-based SIM on the WIN and the SN, according to a second embodiment of the present invention.

Different from the SCP-based SIM in FIG. 4, in the method of implementing ANCM service using the HLR-based SIM, the serving MSC receiving the SMDPP from the SMC sends a Location Request (LOCREQ) to the HLR when the ancm-available-trigger is activated. This is done after examining the trigger of the receiving mobile subscriber. The HLR then analyzes the received parameters, and sends a Service Request (SVCREQ) to the SN after including the pertinent service ID and required parameter, as recited in Steps ST11, ST12 (FIG. 3).

The SN preferably returns an appropriate result message (svcreq) to the HLR, based on an examination of the service registering and activation of the pertinent subscriber. The HLR transmits the result message received from the SN to the serving MSC (locreq), and the communication channel is then set between the serving MSC and SN, as shown in Step ST13.

The remain sequence of the operation is identical to the operation described with respect to FIG. 4, and is incorporated herein by reference.

Figure 6:
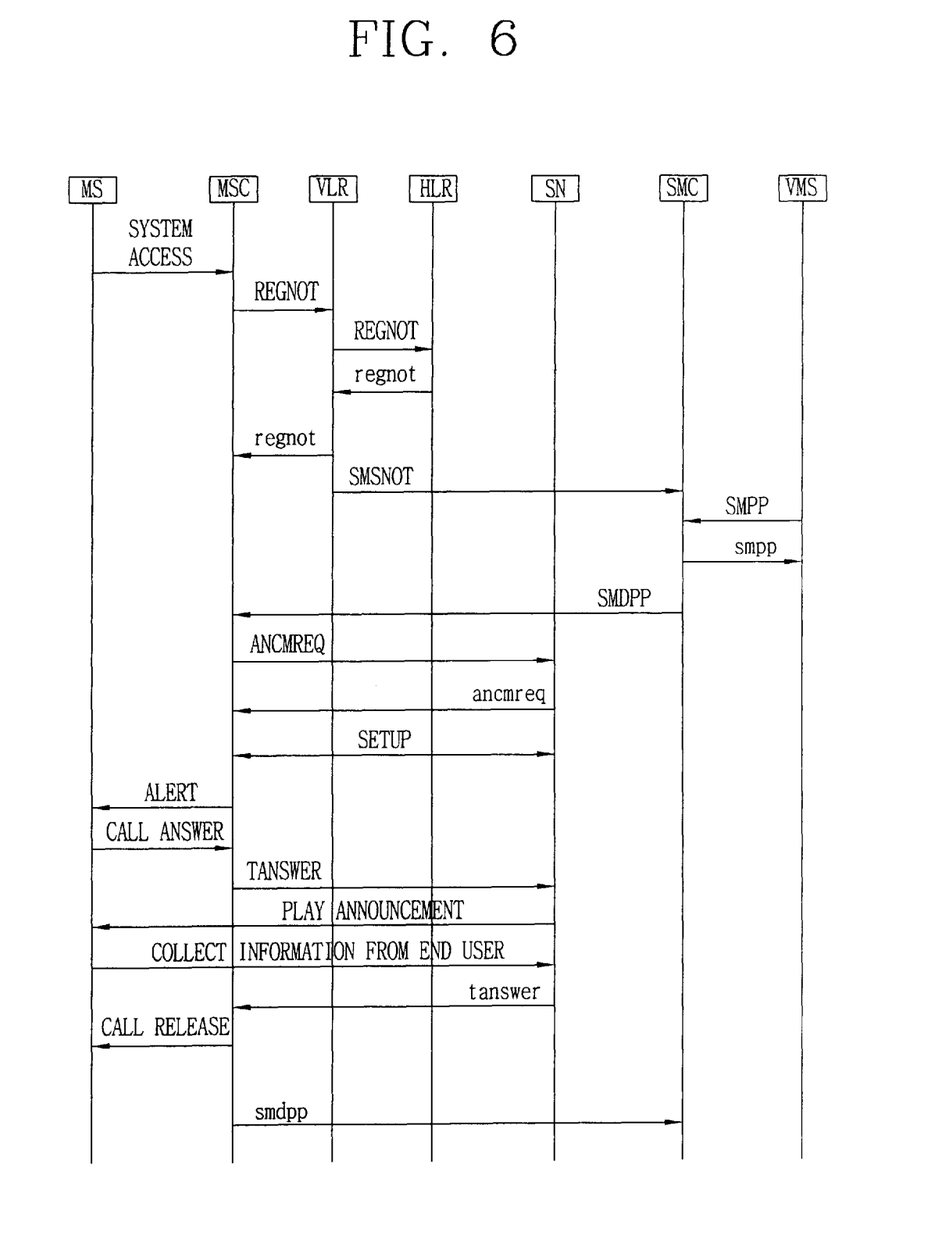
FIG. 6 is a diagram illustrating the ANCM service implementation process for a voice message by a SCP-based SIM on the WIN provided by using the SN according to the first preferred embodiment of the present invention.
Figure 7:
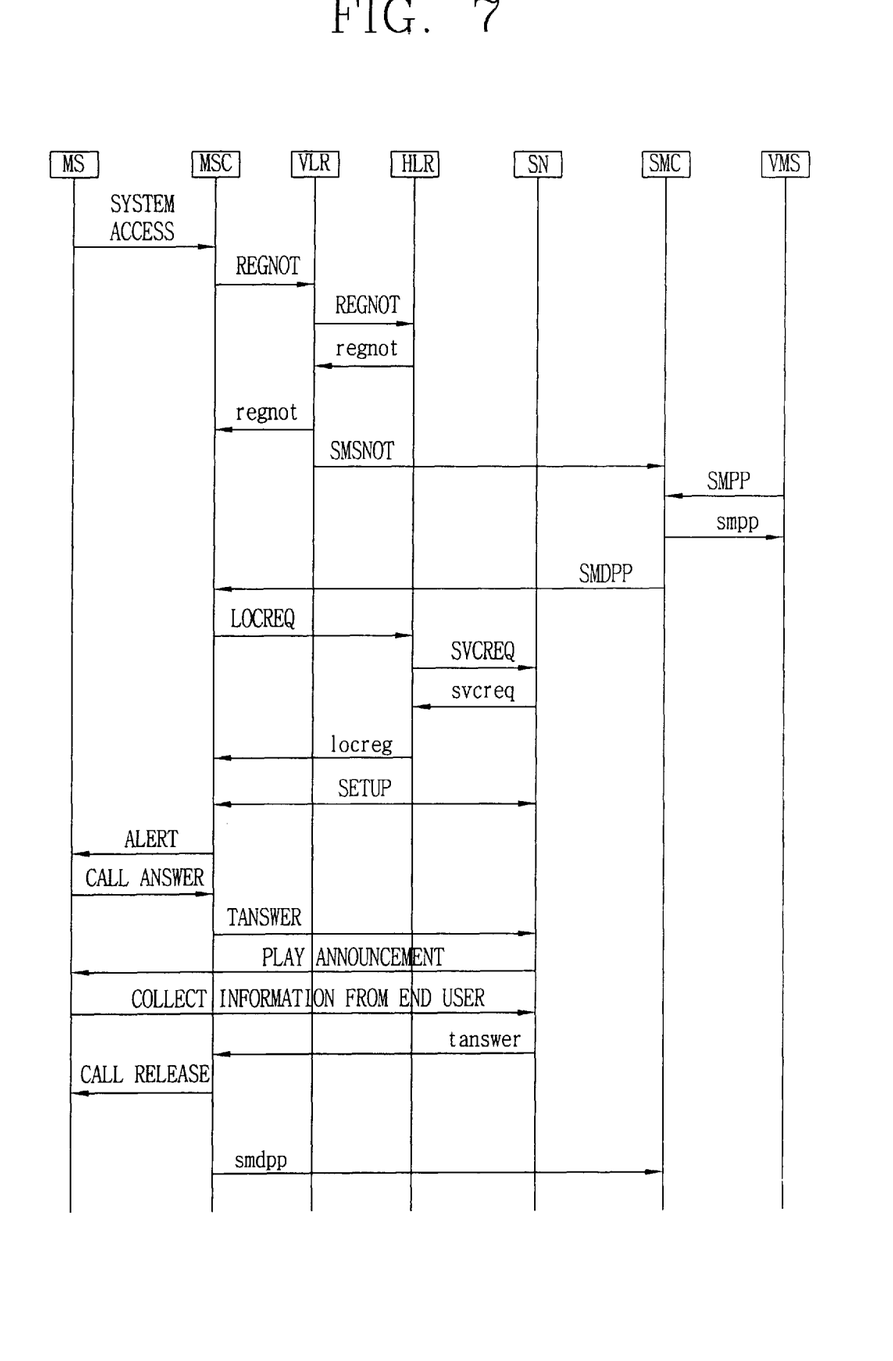
FIG. 7 is a diagram illustrating the ANCM service implementation process for the voice message by a HLR-based SIM on the WIN provided by using the SN according to the second preferred embodiment of the present invention.

FIGS. 6 and 7 are diagrams that illustrate information flows when the received standby message is a voice message. The method and information flow is similar to those described with reference to FIGS. 4 and 5. The difference, however, is that when a reception standby voice message is at issue, the VMS is invoked. The VMS notifies the SMC of the standby voice message through the SMPP (Short Message Point-to-Point).

The SMC receives the SMPP from the VMS, and returns a result message (smpp) to the VMS. The same then transmits the SMDPP to the serving MSC.

The remaining steps in the operation are similar to those discussed with reference to processed FIGS. 4 and 5. In this method, however, there is no need to display a character message or sound a notification tone to the receiving terminal, because a voice announcement indicating the reception of the standby voice message is broadcast (for example, an audible voice announcement is made).

Next, a method of implementing an ANCM service using a SCP and IP will be described with reference to FIGS. 8 and 11.

The service control and the service processing are separated in the network configuration separating the SCP and the IP, but the service design concept required for the network configuration using the SN can generally be adapted without modification. In this configuration, the SCP manages the intelligent network service profile and network resource information, and performs functions of opening and registering the pertinent service and connecting between the external resources.

Figure 8:
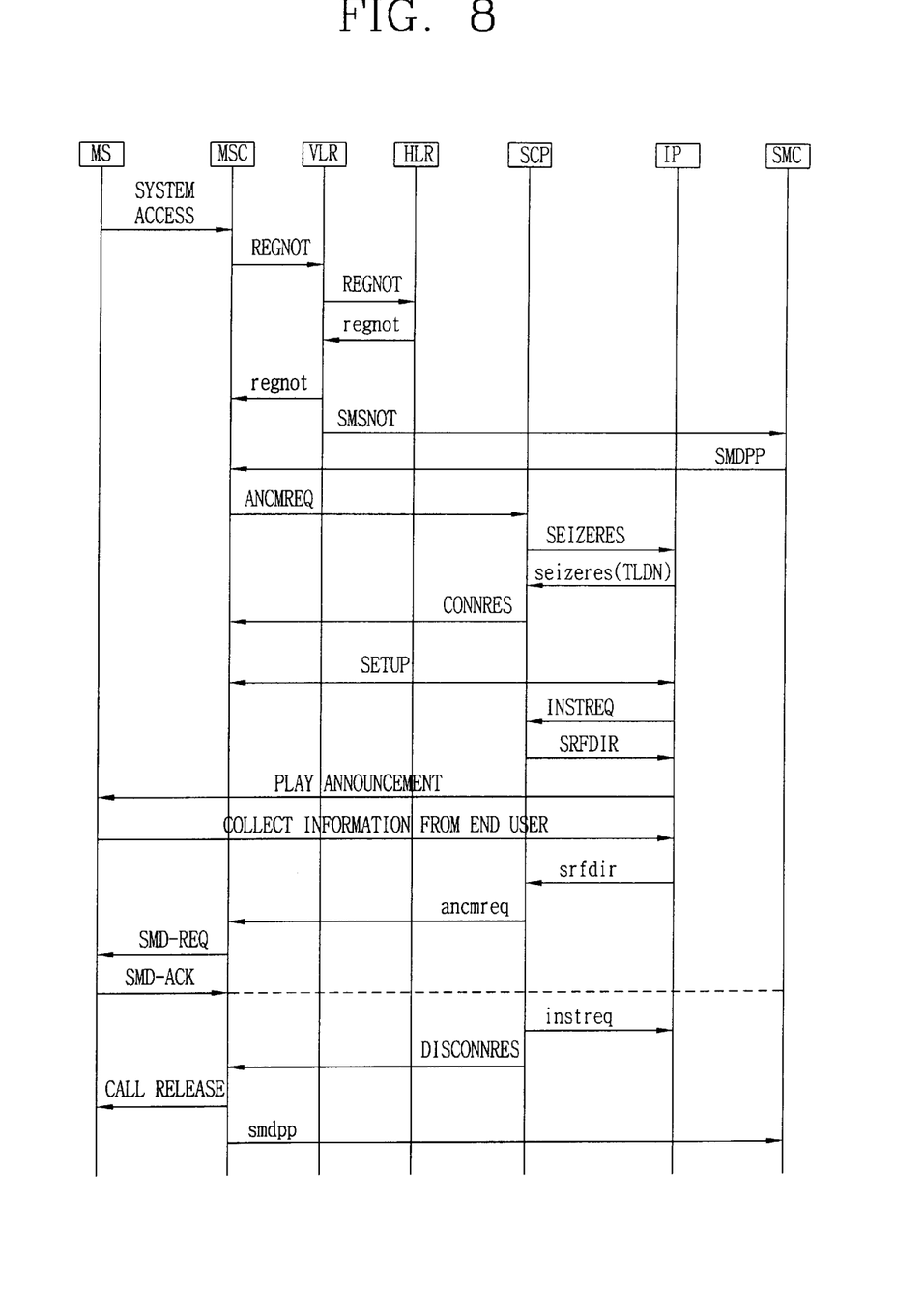
FIG. 8 is a diagram illustrating the ANCM service implementation process for the short message by the SCP-based SIM on the WIN provided by using a SCP (Service Control Point) and an IP (Intelligent Peripheral) according to a third embodiment of the present invention.

FIG. 8 is a diagram illustrating a process of implementing ANCM service implementation process for a short message with a SCP-based SIM on the WIN, by using a SCP and an IP according to a third embodiment of the present invention.

First, when a mobile subscriber, who is registered on the ANCM service, requests a registration notification (REGNOT) from the VLR after roaming in a service available area, the pertinent VLR transmits the request to the HLR. The VLR then transmits a result message (regnot) received from the HLR to the MSC.

When a standby message is received by the subscriber, the VLR notifies the SMC of the user's SMS service available state. It does this by transmitting a Short Message Service Notification (SMSNOT) corresponding to a Message Waiting Notification of the mobile subscriber to the SMC.

It is noted that while performing ANCM service, if the receiving mobile subscriber is in the SMS service available state, the voice notification function of the short message is performed without the location updating process.

The SMC receiving the SMSNOT transmits a SMDPP (Short Message Delivery Point-to-Point) to the Serving MSC, as recited in Step ST11.

Next, when the Serving MSC examines a trigger of the receiving mobile subscriber and ancm-available-trigger is activated, the Serving MSC sends an ANCMREQ to the SCP. The SCP, in turn, transmits a Seize Resource (SEIZERES) to the IP when service is possible, after examining the pertinent service registering and activation. It does this by searching the profile of the receiving mobile subscriber, as recited in Step ST12.

The IP then generates a Temporary Local Directory Number (TLDN) and transmits it to the SCP. It does this using the ID of the receiver received from the SCP. The SCP then transmits a Connection Resource (CONNRES) to the MSC in the place of the receiving mobile subscriber with the TDLN received from the IP, as recited in Step ST13.

The communication channel is then set between the serving MSC and IP.

After the communication channel is thus setup, the IP makes an Instruction Request (INSTREQ) to the SCP in order to receive the next operation order.

The SCP accordingly transmits a SRFDirective (SRFDIR) to the IP with the voice information according to the ID. The IP thus broadcasts the pertinent recorded announcement, as recited in Stepps ST14, ST15.

The IP receives dialed digits from the receiving subscriber and returns a result message of the SRFDIR (srfdir) to the SCP.

The SCP determines whether to perform the SMDPP or to transmit a Disconnection Resource (DISCONNRES) to the serving MSC in order to cut the call. It makes this determination by analyzing the received digits, and returns a result message of INSTREQ (instreq) to the IP, as recited in Step ST16.

Meanwhile, the serving MSC receives an ancmreq message in accordance with the message transmitted from the SCP, and sends the SMD-REQ to the MS. When the MSC receives the DISCONNRES, it releases the present call setting, and returns the smdpp to the SMC, as recited in Step ST17.

Figure 9:
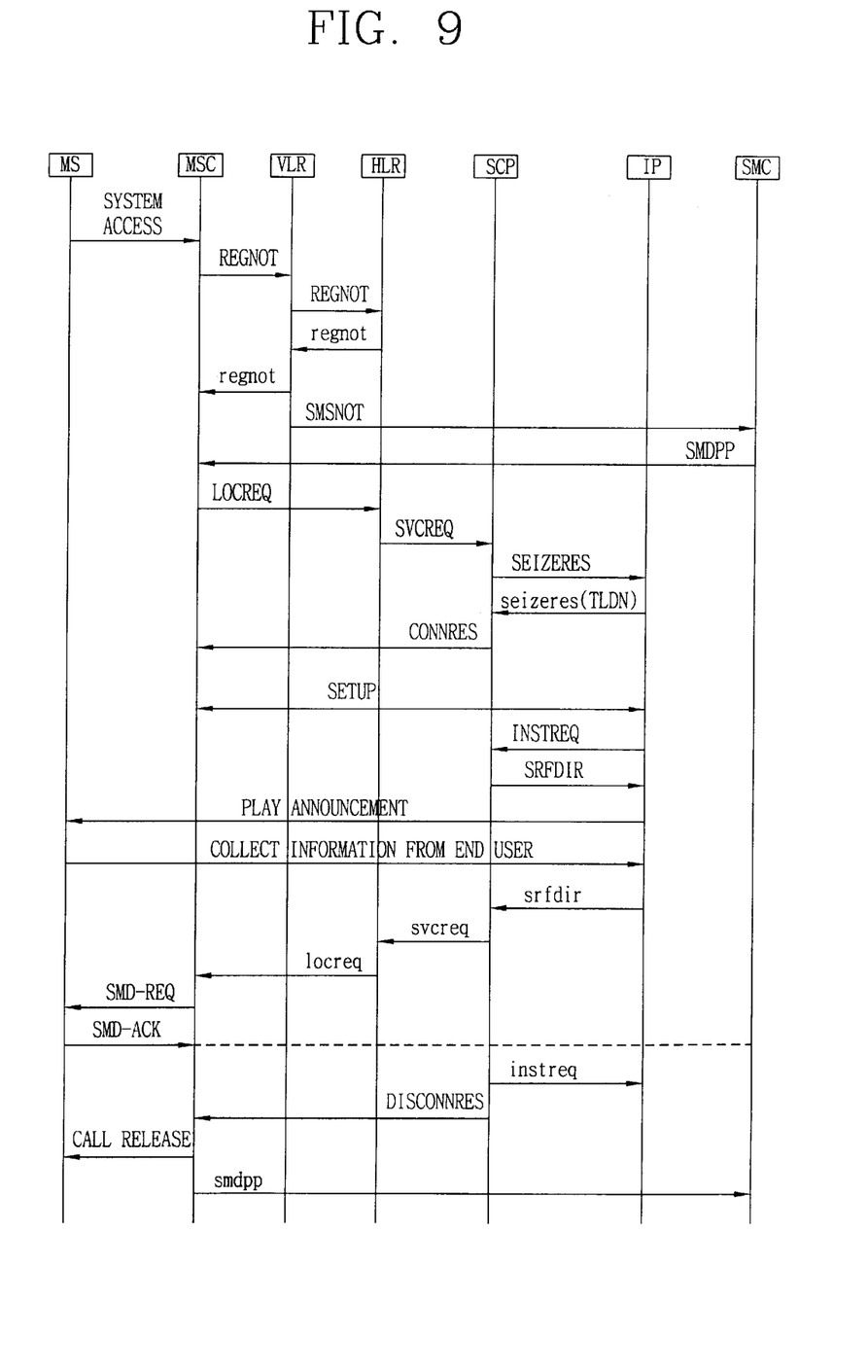
FIG. 9 is a diagram illustrating the ANCM service implementation process for the short message by a HLR-based SIM on the WIN provided by using the SCP and IP according to a fourth embodiment of the present invention.

FIG. 9 is a diagram illustrating the method of implementing ANCM service for a short message by an HLR-based SIM on the WIN, using the SCP and IP according to a fourth embodiment of the present invention.

In the ANCM service implementation process adapting the HLR-based SIM, when a LOCREQ is sent to the HLR, the HLR sends a SVCREQ (Service Request) to the SCP. This is done after the HLR analyzes the received parameters and includes the pertinent service ID and the required parameters. It is noted that this differs from the ANCMREQ transmission of the MSC to the SCP in the process adapting SCP-based SIM, as recited in FIG. 8.

The SCP preferably transmits the SEIZERES to the IP when service is possible, after examining the pertinent service registering and activation by searching the receiving mobile subscriber profile, as recited in Steps ST11, ST12.

The IP generates a TDLN and transmits it to the SCP using the receiver ID received from the SCP. The SCP transmits the CONNRES to the MSC in the place of the receiver mobile subscriber with the TDLN received from the IP, as described in Step ST13.

The communication channel is then set between the serving MSC and IP. The IP next sends an INSTREQ to the SCP in order to receive the next operation order. The SCP accordingly transmits the SRFDirective (SRFDIR) to the IP with the voice information, according to the reception standby message ID. The IP, in turn, broadcasts a recorded announcement, as described in Steps ST14, ST15.

The result message of the SRFDIR (srfdir) is returned to the SCP after receiving the dialed digits from the receiving subscriber, as recited in Step ST16. According to this, the SCP determines whether to perform the SMDPP or to transmit a DISCONNRES to the serving MSC. It makes this determination by by analyzing the received digits and applies the result message corresponding to the SVCREQ (svcreq) to the HLR or applies the DISCONNRES to the MSC. The result message of the INSTREQ (instreq) is then returned to the IP, as shown in Step ST17.

Figure 10:
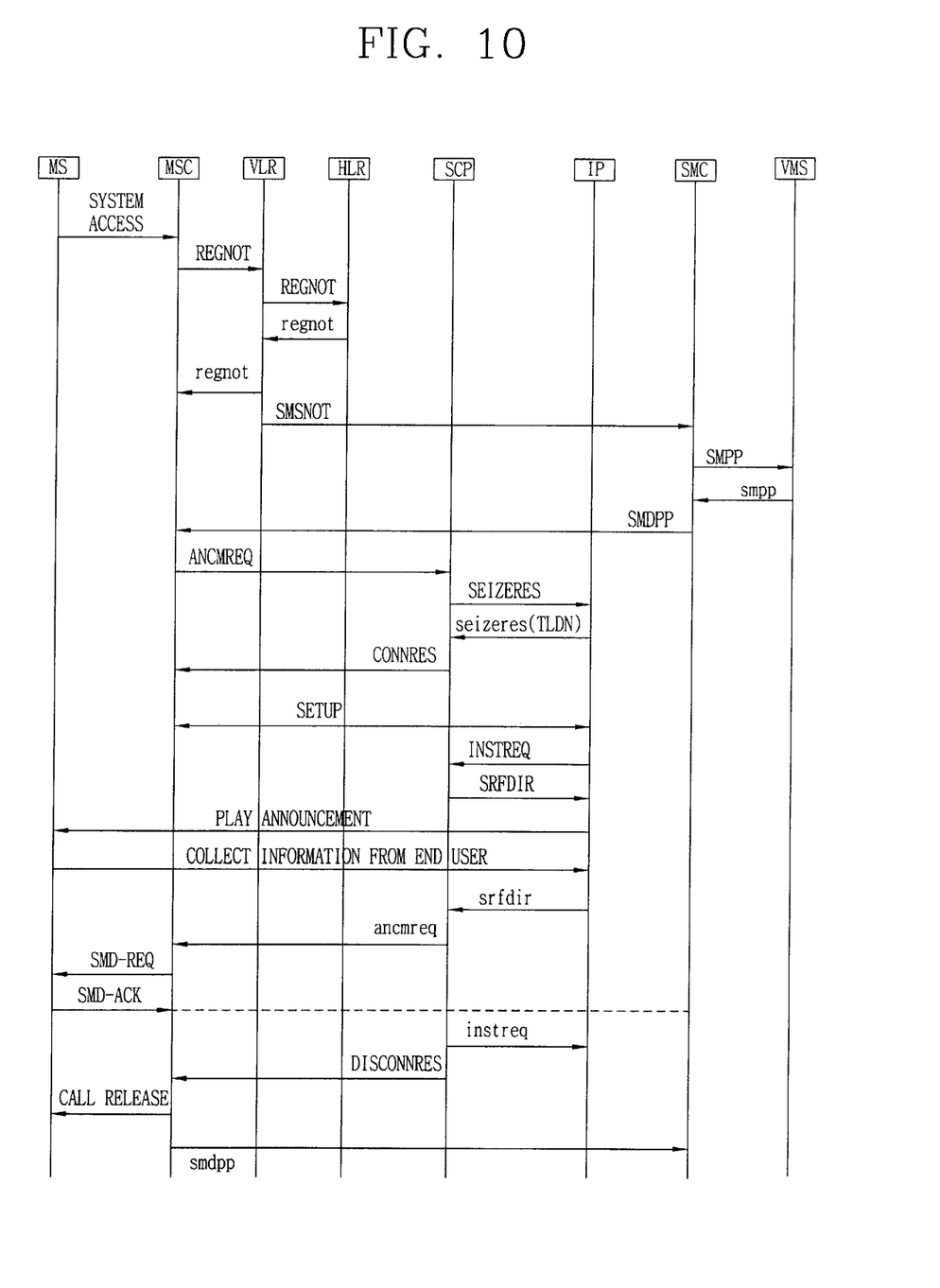
FIG. 10 is a diagram illustrating the ANCM service implementation process for the voice message by the SCP-based SIM on the WIN provided by using the SCP and IP according to the third embodiment of the present invention.
Figure 11:
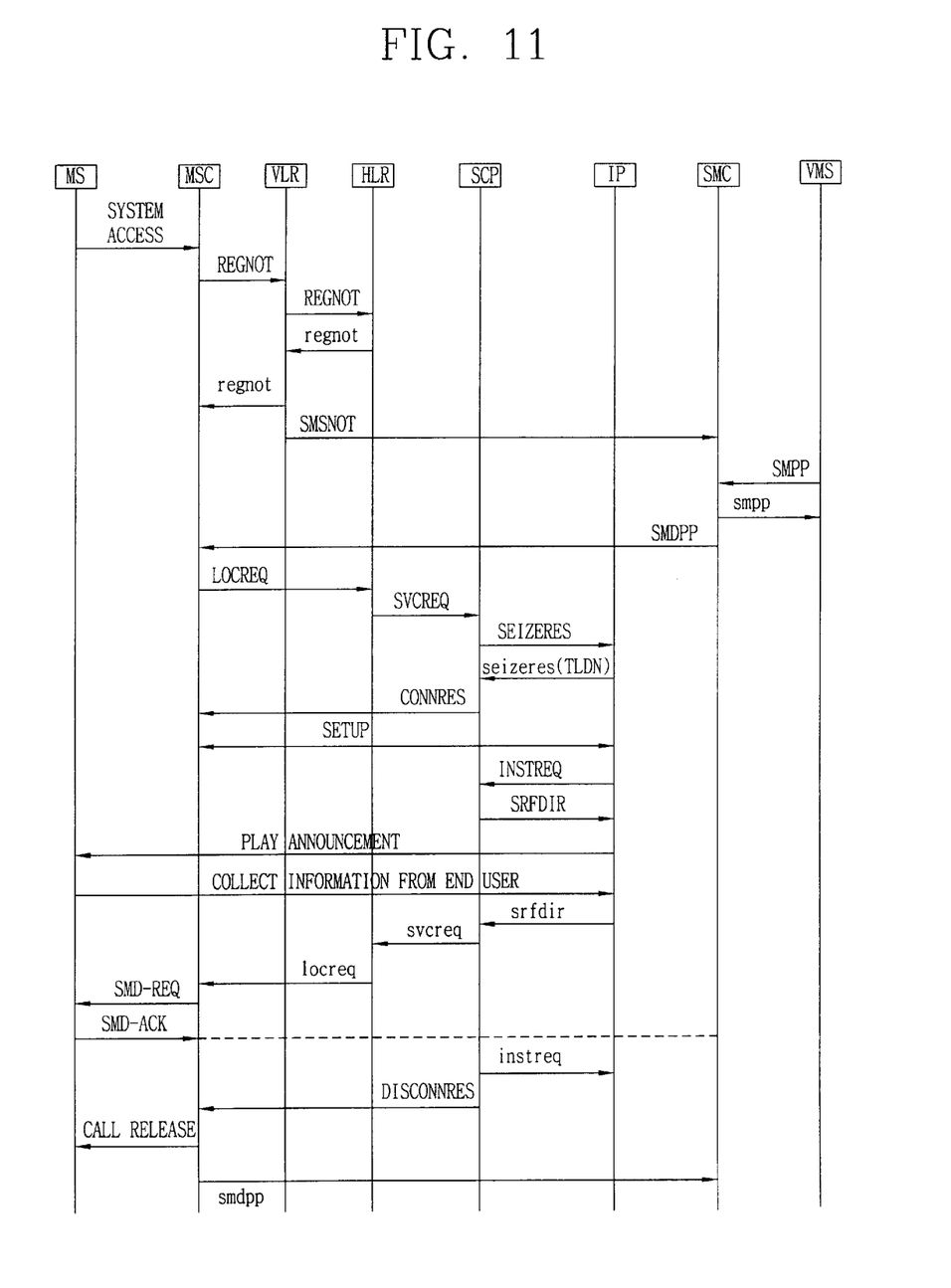
FIG. 11 is a diagram illustrating the ANCM service implementation process for the voice message by the HLR-based SIM on the WIN provided by using the SCP and IP according to the fourth embodiment of the present invention.

FIGS. 10 and 11 are diagrams that illustrate information flows when there are reception standby voice messages. These figures are similar to FIGS. 8 and 9. They differ in that when there is a reception standby voice message to the VMS, the pertinent VMS notifies it to the SMC through the SMPP. Additionally, the SMC receiving the SMPP from the VMS returns the result message (smpp) to the VMS, and transmits the SMDPP to the serving MSC.

The remaining steps of the method are processed according to the process illustrated in FIGS. 8 and 9, and the corresponding description is incorporated by reference.

As described above, the ANCM service on the WIN as described herein has many advantages. For example, the ANCM service on the WIN is capable of restricting message reception by selecting reception of a voice or character message in accordance with the intention of the subscriber. Accordingly, the present invention can provide a function for selecting or filtering certain mail, such as a spam mail, advertising messages, or voice messages in accordance with the subscriber's preferences. The ANCM service on the WIN also provides various ways to adjust the notification function in the message reception according to the subscriber's taste. In addition, the present invention is very useful for a blind or elderly people.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of performing Audible Notification of a Called Message (ANCM) on a Wireless Intelligent Network (WIN), comprising:
    initiating a Short Messaging Service (SMS) to a prescribed Mobile Switching Center (MSC) when a standby voice or short message is received;
    establishing a communication channel between the MSC and an ANCM service control system; and
    connecting a call from the MSC to a receiving terminal of a mobile subscriber and transmitting a recorded announcement from the ANCM service control system to the receiving terminal that announces reception of the received standby message, wherein the method further includes: activating the ANCM service of the mobile subscriber when the ANCM service is registered or when digits for activating the ANCM service are inputted by the mobile subscriber, and de-activating the ANCM service when the ANCM service is de-authorized or when digits for inactivating the ANCM service are inputted by the mobile subscriber.

2. The method of claim 1, further comprising:
    transmitting a notification of the standby message from a Voice Message System (VMS) to a Short Message Center (SMC) and returning a corresponding result message from the SMC to the VMS.

3. The method of claim 1, further comprising:
    receiving an input from the receiving terminal;
    determining whether to transmit the standby message according to the received input; and
    transmitting the standby message or releasing the call connection according to a result of the determination.

4. The method of claim 1, wherein a language of the recorded announcement is selected from a plurality of languages, and a voice tone is selected from a plurality of voice tones.

5. The method of claim 1, wherein the recorded announcement comprises a caller's name, wherein the caller's name is determined by using the ID of the standby message.

6. The method of claim 1, wherein ANCM service of the mobile subscriber is authorized and is de-authorized on the ANCM service control system by an operator command.

7. The method of claim 6, wherein the operator is the mobile subscriber.

8. A method of performing Audible Notification of a Called Message (ANCM) on a Wireless Intelligent Network (WIN), comprising:
    initiating a Short Messaging Service (SMS) to a prescribed Mobile Switching Center (MSC) when a standby voice or short message is received;
    establishing a communication channel between the MSC and an ANCM service control system; and
    connecting a call from the MSC to a receiving terminal of a mobile subscriber and transmitting a recorded announcement from the ANCM service control system to the receiving terminal that announces reception of the received standby message, wherein the process of establishing the communication channel comprises:
        sending an ANCM service request from the MSC to a Service Node (SN) after confirming an ANCM service activation state by checking an ancm-available-trigger of the mobile subscriber when the ANCM service control system is configured for the SN; and
        returning a result message from the SN to the MSC, wherein the result message comprises a corresponding parameter, which is determined by searching a profile of the mobile subscriber.

9. A method of performing Audible Notification of a Called Message (ANCM) on a Wireless Intelligent Network (WIN), comprising:
    initiating a Short Messaging Service (SMS) to a prescribed Mobile Switching Center (MSC) when a standby voice or short message is received;
    establishing a communication channel between the MSC and an ANCM service control system; and connecting a call from the MSC to a receiving terminal of a mobile subscriber and transmitting a recorded announcement from the ANCM service control system to the receiving terminal that announces reception of the received standby message, wherein the process of establishing the communication channel comprises:

transmitting a Location Request from the MSC to a Home Location Register (HLR) in an ANCM service activation state by checking an ANCM-available-trigger of the receiving mobile subscriber when the ANCM service control system is configured for a Service Node (SN);

transmitting a service requesting message including a corresponding service ID and required parameters from the HLR to the SN after analyzing received parameters;

returning the corresponding result message from the SN to the HLR after checking a service registration and activation state of the subscriber; and transmitting from the HLR a result message received from the SN to the MSC.

10. A method of performing Audible Notification of a Called Message (ANCM) on a Wireless Intelligent Network (WIN), comprising:

initiating a Short Messaging Service (SMS) to a prescribed Mobile Switching Center (MSC) when a standby voice or short message is received;

establishing a communication channel between the MSC and an ANCM service control system; and connecting a call from the MSC to a receiving terminal of a mobile subscriber and transmitting a recorded announcement from the ANCM service control system to the receiving terminal that announces reception of the received standby message, wherein the process of establishing the communication channel comprises:

sending an ANCM service request from the MSC to a Service Control Point (SCP), after confirming an active state of ANCM service by checking an ANCM-available-trigger of the receiving mobile subscriber when the ANCM service control system is configured for the SCP and an Intelligent Peripheral (IP);

transmitting a Seize Resource from the SCP to the IP when service is possible after determining whether service is authorized and activated by searching a profile of the receiving subscriber;

transmitting a Temporary Local Directory Number (TLDN) to the SCP from the IP after generating it using an ID of the receiving subscriber received from the SCP by the IP; and transmitting a Connection Resource to the MSC including the transmitted TLDN from the SCP.

11. A method of performing Audible Notification of a Called Message (ANCM) on a Wireless Intelligent Network (WIN), comprising:

initiating a Short Messaging Service (SMS) to a prescribed Mobile Switching Center (MSC) when a standby voice or short message is received;

establishing a communication channel between the MSC and an ANCM service control system; and connecting a call from the MSC to a receiving terminal of a mobile subscriber and transmitting a recorded announcement from the ANCM service control system to the receiving terminal that announces reception of the received standby message, wherein the process of establishing the communication channel comprises:

transmitting a Location Request from the MSC to a Home Location Register (HLR) in an ANCM service activated state by checking an ANCM-available-trigger of the receiving mobile subscriber when the ANCM service control system is configured for a Service Control Point (SCP) and an Intelligent Peripheral (IP);

transmitting a Service Request from the HLR to the SCP;

transmitting a Seize Resource to the IP and a result message to the HLR from the SCP when service is possible after checking the service registering and activation by searching a profile of the corresponding subscriber;

transmitting a Temporary Local Directory Number (TLDN) from the IP to the SCP after generating the TLDN using the ID of the receiver received from the SCP; and transmitting a Connection Resource from the SCP to the MSC, wherein the Connection Resource includes the TLDN.

12. A method of providing Audible Notification of Called Message (ANCM) service, comprising:

initiating a Short Message Delivery Point-to-Point (SMDPP) to a Mobile Switching Center (MSC) by a Short Message Center (SMC) when a standby message is received for a mobile subscriber;

establishing a communication channel between a Service Node (SN) and the MSC when an ancm-available-trigger is activated after checking the trigger of the receiving mobile subscriber by the MSC;

broadcasting a prescribed announcement to announce a reception of the standby message by connecting a call to a receiving terminal of the mobile subscriber;

determining whether to transmit the received standby message based on an input from the receiving terminal; and transmitting the received standby message or releasing the call connection based on a result of the determination.

13. The method of claim 12, wherein establishing the communication channel comprises:

sending an ANCM service request from the MSC to the SN after the MSC confirms an ANCM service activation state by checking the ancm-available-trigger of the receiving mobile subscriber; and returning a result message that comprises a corresponding parameter from the SN to the MSC, wherein the result message is generated by the SN by searching a profile of the mobile subscriber.

14. The method of claim 12, wherein establishing the communication channel comprises:

transmitting a Location Request from the MSC to a Home Location Register (HLR) after the MSC confirms an ANCM service activation state by checking an ancm-available-trigger of the receiving mobile subscriber;

transmitting a service requesting message from the HLR to the SN, the service requesting message including a service ID and required parameters determined by analyzing the received parameters by the HLR;

returning a corresponding result message from the SN to the HLR by checking a service registration and activation state of the corresponding subscriber by the SN; and transmitting the result message from the HLR to the MSC.

15. The method of claim 12, wherein a language and voice tone of the subscriber from among a plurality of prescribed announcements is selected by the mobile languages and a plurality of voice tones.

16. The method of claim 12, wherein the prescribed announcement includes a caller's name, wherein the caller's name is determined based on an ID of the standby message.

17. The method of claim 12, wherein the step of initiating SMDPP service and the step of transmitting the received message are performed when a standby voice message is received, after the VMS notifies the SMC of reception of the standby voice message through the Short Message Point-to-Point, and a corresponding result message is returned to the VMS by the SMC.

18. A method of providing ANCM service, comprising:

initiating a Short Message Delivery Point-to-Point (SMDPP) to service from a Short Message Center (SMC) to a Mobile Switching Center (MSC) when a standby short message to a mobile subscriber is received;

establishing a communication channel between an Intelligent Peripheral (IP) and the MSC when an ancm-available-trigger is activated after the MSC checks the trigger of the receiving mobile subscriber;

broadcasting a prescribed announcement indicating a reception of the standby message by connecting a call to the corresponding receiving terminal;

determining whether to transmit the received message in response to a digit inputted at the corresponding receiving terminal; and transmitting the standby message or releasing the call connection based on the determination.

19. The method of claim 18, wherein the step of establishing the communications channel comprises:

sending an ANCM service request from the MSC to a Service Control Point (SCP) after confirming an ANCM service activated state by checking the ancm-available-trigger of a receiving mobile subscriber;

transmitting a Seize Resource from the SCP to the IP when the service is possible as determined by checking whether the service is registered and activated by searching a profile of the corresponding subscriber by the SCP;

transmitting a Temporary Local Directory Number (TLDN) from the IP to the SCP after the IP generates the TLDN using an ID of the receiving subscriber received from the SCP; and transmitting a Connection Resource from the SCP to the corresponding MSC including the transmitted TLDN.

20. The method of claim 18, wherein establishing the communications channel comprises:

transmitting a Location Request from the MSC to the Home Location Register (HLR) in the ANCM service activated state by checking an ancm-available-trigger of the receiving mobile subscriber by the MSC;

transmitting the Service Request from the HLR to the SCP;

transmitting a Seize Resource from the SCP to the IP and the result message to the HLR when service is possible after determining whether the service is registered and activated by searching the profile of the corresponding subscriber by the SCP;

transmitting a Temporary Local Directory Number (TLDN) from the IP to the SCP after the IP generates the TLDN using an ID of the receiving subscriber received from the SCP; and transmitting a Connection Resource from the SCP to the corresponding MSC, the Connection Resource including the TLDN transmitted from the IP.

21. The method of claim 18, wherein the prescribed announcement is selected by the mobile subscriber from among a plurality of languages and a plurality of voice tones.

22. The method of claim 18 wherein the prescribed announcement includes a caller's name, wherein the caller's name is determined by using the ID of the standby message.

23. The method of claim 18, wherein the initiating step and the transmitting step are performed when a voice message is waiting to be transmitted to the corresponding mobile subscriber, after the VMS notifies the SMC of the standby voice message through the Short Message Point-to-Point, and the SMC returns the corresponding result message to the VMS.

* * * * *